US006893068B1

(12) United States Patent
Varner

(10) Patent No.: US 6,893,068 B1
(45) Date of Patent: May 17, 2005

(54) EXTENDABLE POLE FOR HANGING DECORATIONS OVERHEAD

(75) Inventor: Victoria Varner, 3812 Dilworth Rd., Montgomery, AL (US) 36108

(73) Assignee: Victoria Varner, Montgomery, AL (US)

( * ) Notice: Subject to any disclaimer, the term of this patent is extended or adjusted under 35 U.S.C. 154(b) by 0 days.

(21) Appl. No.: 10/700,153

(22) Filed: Nov. 3, 2003

(51) Int. Cl.[7] .................................................. B25J 1/00
(52) U.S. Cl. ........................................ 294/24; 294/19.1
(58) Field of Search .......................... 294/19.1, 24, 22, 294/23; 7/105, 170; 466/475; 242/588.6, 129

(56) References Cited

U.S. PATENT DOCUMENTS

| | | | | |
|---|---|---|---|---|
| 1,566,213 A | * 12/1925 | Hoberg | | 294/22 |
| 2,576,705 A | * 11/1951 | Mortimer | | 294/19.1 |
| 4,607,871 A | * 8/1986 | Kirkman | | 294/19.1 |
| 4,653,142 A | * 3/1987 | Upton | | 16/429 |
| 5,553,905 A | * 9/1996 | Bentivegna | | 294/24 |
| 5,560,975 A | * 10/1996 | Casper | | 428/99 |
| 5,632,519 A | * 5/1997 | Stock | | 294/19.1 |
| 5,713,617 A | * 2/1998 | Marinaro | | 294/24 |
| 5,964,489 A | * 10/1999 | Mahoney | | 294/24 |
| 6,398,619 B1 | * 6/2002 | Webb | | 446/475 |
| 6,425,155 B1 | * 7/2002 | Carey | | 7/105 |
| 6,652,013 B1 | * 11/2003 | Peterson | | 294/19.1 |

* cited by examiner

*Primary Examiner*—Kathy Matecki
*Assistant Examiner*—Esther O. Okezie

(57) ABSTRACT

An elongated, extendable pole(10) having a plurality of holding devices. A flexible platform(12) of predetermined circumference sits atop the pole(10) to press the adhesive end of a decoration to the ceiling. A sharp pointed lip(14) attached to the platform(12) removes the decoration. Opposite the lip(14) is a lead in slit(16) on the platform(12) which steadies ribbons or string placed upon the platform(12). Beneath the platform(12) are a set of contiguous containers (18) to hold the curling ribbon and tiny light weight decor being hung. Below the containers(18), to one side of the pole(10), is an extensible spindle(20) upon which crepe paper streamers are placed and dispensed. Held against the lower portion of the pole(10) is a removable book(22) which inserts into the spindle(20) thereby providing a place for balloons and larger light weight decor to be elevated to the ceiling and hung. When not in use the pole (10) may be hung by the strap (30) connected to its distal end.

3 Claims, 4 Drawing Sheets

EXTENDABLE POLE FOR HANGING DECORATIONS OVERHEAD

CROSS REFERENCE TO RELATED APPLICATIONS

Not applicable

BACKGROUND

1. Field of Invention

This invention relates to extendable poles used for elevating objects, more particularly, an extendable pole having numerous devices for hanging party decorations overhead.

2. Description of Prior Art

It is common practice when decorating for a party to add a festive look to the room by hanging decorations from the ceiling. The decorations are usually light weight objects such as balloons, crepe paper streamers, curling ribbons, or paper cut outs. These are all normally attached to the ceiling by way of sticky putty, adhesive tape, or tacks. In order to reach the ceiling a stool, step ladder, or large piece of furniture is utilized requiring uncomfortable stretching and balancing. But standing atop a stool or ladder while moving tacks from a box, or tape from a dispenser in order to attach the decoration in hand is difficult, time consuming and unsafe. Also, the assistance of another individual is usually required to hand up the additional items as needed. And even with assistance, the ladder or stool must still be moved about the room as each decorative piece is hung overhead.

U.S. Pat. No. 6,398,619 to Webb (2002) slightly attempts to address these issues by offering an elongated pole which holds a roll of crepe paper and adhesive tape. However, with this invention only crepe paper streamers can be utilized, which results in reverting back to the unsafe and difficult method of perching atop a stool or ladder to hang the various other decorations. An additional problem encountered with a crepe paper streamer is that when being taken down, it often breaks near the adhesive tape leaving behind bits of dangling paper. This invention does not provide a way of completely removing the streamer from the ceiling in the event of breakage.

U.S. Pat. No. 6,446,408 to Gorin, et al (2002) provides a retractable and extendable invention to elevate items to substantial heights, however, this invention is not a household device, but an industrial one, and is in no way constructed to be used as a mechanism to attach and remove party decorations from a ceiling.

Several types of extension poles and dispensing devices have been proposed—for example—U.S. Pat. No. 6,101,657 to Hamilton (2000) shows an applicator with an extension. This device is specifically designed for use with paintbrushes to facilitate more accurate control. U.S. Pat. No. 4,000,537 to Woo (1977) shows a roller device with juxtaposed rollers. This device is also constructed only for the benefit of paintbrushes. U.S. Pat. No. 4,896,394 to Linn, et al (1990) shows an extensible handle created for paint rollers, U.S. Pat. No. 5,725,726 to Yu (1998) shows a dispenser for tape with a contact roller which decreases noise generated from stripping tape.

None of these inventions and patents mentioned, taken either singly or in combination is capable of solving the existing problems encountered when hanging and removing party decorations to enhance a festive occasion. Due to my invention's unique properties, simplicity, and effectiveness none of the existing prior art rivals its construction nor accomplishes its intended purpose.

SUMMARY

The present invention provides a method of attaching and removing light weight decorative items to and from ceilings of various heights.

OBJECTS AND ADVANTAGES

Accordingly, several objects and advantages of the present invention are:

(a.) a principle object to provide a safe, quick and simple extension pole capable of elevating a decoration to the ceiling.

(b.) a major object to provide an extension pole which completely removes decorations from the ceiling.

(c.) to provide an extension pole for elevating a variety of decorations with the same device.

(d.) to provide an extension pole for decorating overhead without the assitance of steps, ladders, or additional people.

It is the general object to provide an extendable pole with which to attach decorations to either small or expensive overhead areas with minimal walking. Further objects and advantages are to provide a pole that supplies permanently attached devices capable of securely holding the decorations as they are being elevated. Still further objects and advantages will become apparent from a consideration of the ensuing description and drawings.

DRAWING FIGURES

REFERENCE NUMERALS

| | |
|---|---|
| 10 | EXTENDABLE POLE |
| 12 | PLATFORM |
| 14 | LIP |
| 16 | SLIT |
| 18 | CONTAINERS |
| 20 | SPINDLE |
| 22 | HOOK |
| 24 | NET |
| 26 | BARRELS |
| 28 | HAND GRIP |
| 30 | HANGING STRAP |

DESCRIPTION

FIG. 1-PREFERRED EMBODIMENT

Figure 1:
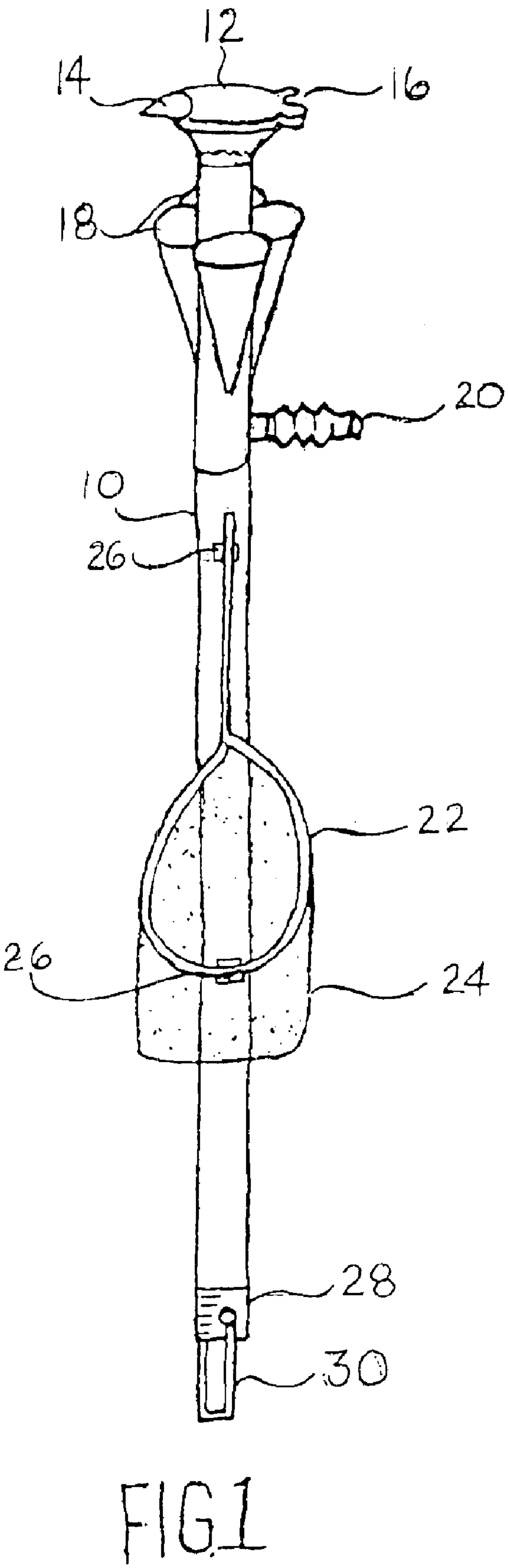
FIG. 1 is a plan view showing the various devices of an extendable pole used to decorate overhead areas.

A preferred embodiment of the extension pole of the present invention illustrated in FIG. 1 is generally indicated by the number 10. The extension pole 10 is comprised of several devices for the purpose of hanging various type decorations. The top of the pole 10 holds a platform 12 of predetermined circumference. The platform 12 adheres to the pole 10 preferably by virtue of a permanently bonding substance. Or a stud may be bored through the platform 12 as well. A triangular shaped lip 14 extends from the edge of the platform 12. The point of the lip 14 allows its insertion between the ceiling and the decoration's adhesive point for removal of the decoration. In the preferred embodiment the platform 12 is made of foam. However, the platform 12 can consist of any other material such as flexible rubber or a variety of plasticized substances that automatically spring back into shape when urged against a flat surface.

Laterally aligned with the lip 14 is a predetermined lead in slit 16 on the opposite edge of the platform 12. This slit 16 serves as a guiding and steady mechanism for the ribbons used to hand the decorations.

Variations of the pole 10 could be telescoping poles of varying length according to the needs of the user. The pole 10 could be made of metal but is preferably a hollow polymer plastic. A substantial weight saving can be obtained by using the hollow polymer plastic resulting in increased ease of use.

Attached around the body of the pole 10, being sufficiently spaced below the platform 12 to are a series of contiguous cylindrical containers 18. These provide the placement for curling ribbons or any lightweight decor being hung. In the preferred embodiment the containers 18 are permanently secured to the pole 10 with a sealing mixture. Additional embodiments would be removable containers 18 held around the pole 10 by the attachment of open bands into which they are slid, or enabling the containers to be clipped onto an attached edifice encircling the pole 10.

Longitudinally aligned with the slit 16 of the platform 12 is a laterally extendable spindle 20 having sufficient space beneath the containers 18 to hold a standard 5 1'2 inch diameter roll of crepe paper. The spindle 20 is disposed on the pole 10 with a permanent bonding mixture and may be outstretched with a single pull when needed to hold crepe paper. However, it may also be presented as a removable device inserted into an opening of predetermined depth in the pole 10. in the preferred embodiment, the spindle 20 has a central passageway sized for the insertion of a transversely aligned rod, shaped to form a hook 22 whereby balloons and larger lightweight decorations may be held. This inserted hook 22 which is laterally curved to meet itself, further includes a net 24 connected to the inner circle of the hook 22.

It should be noted that all the attachments heretofore are disposed on the extendable upper portion of the pole 10. Two sufficiently spaced half moon barrels 26 of predetermined length, are permanently bonded to the lower body of the pole 10 providing placement for the hook 22 when not in use.

A hand grip 30 is formed at the base of the pole 10 in FIG. 1 by covering the base with rubber to provide secure gripping during elevation. In other embodiments, the base may be striated for the same purpose.

A thin length of plasticized material is connected to opposite sides of the the base to provide a hanging strip 32 for the extension pole 10 when not in use. This provision may also be made by creating a through-hole in the midst of the base.

Advantages

From the description above, a number of advantages of my extension pole for decorating become evident:

(a) In high ceiling areas, particularly within two story homes, such a pole allows a user to extend the pole to decorate a normally inaccessible foyer ceiling as well as the ability to decorate stairway ceilings as high as 36 feet. Decorating the stairway heretofore has not been a possibility when using a ladder or stool.

(b) The extendable pole can be readily appreciated by the physically challenged who are wheelchair bound but can now independently decorate ceilings from their sitting position (c) The extendable and retractable pole can allow children to successfully participate in the enjoyment of attaching party decorations to the ceiling.

(d) The extendable pole will provide one superior device for hanging numerous types of decorations.

OPERATION

FIG. 1

The extension pole as seen in FIG. 1 is equipped with devices to accommodate one in hanging several type party decorations from a ceiling. Curling ribbons are placed within the elongated containers 18, rolls of crepe paper streamers are dispensed from the spindle 20, and balloons and paper art are placed inside the net 24 of the hook 22 attachment.

Figure 2:
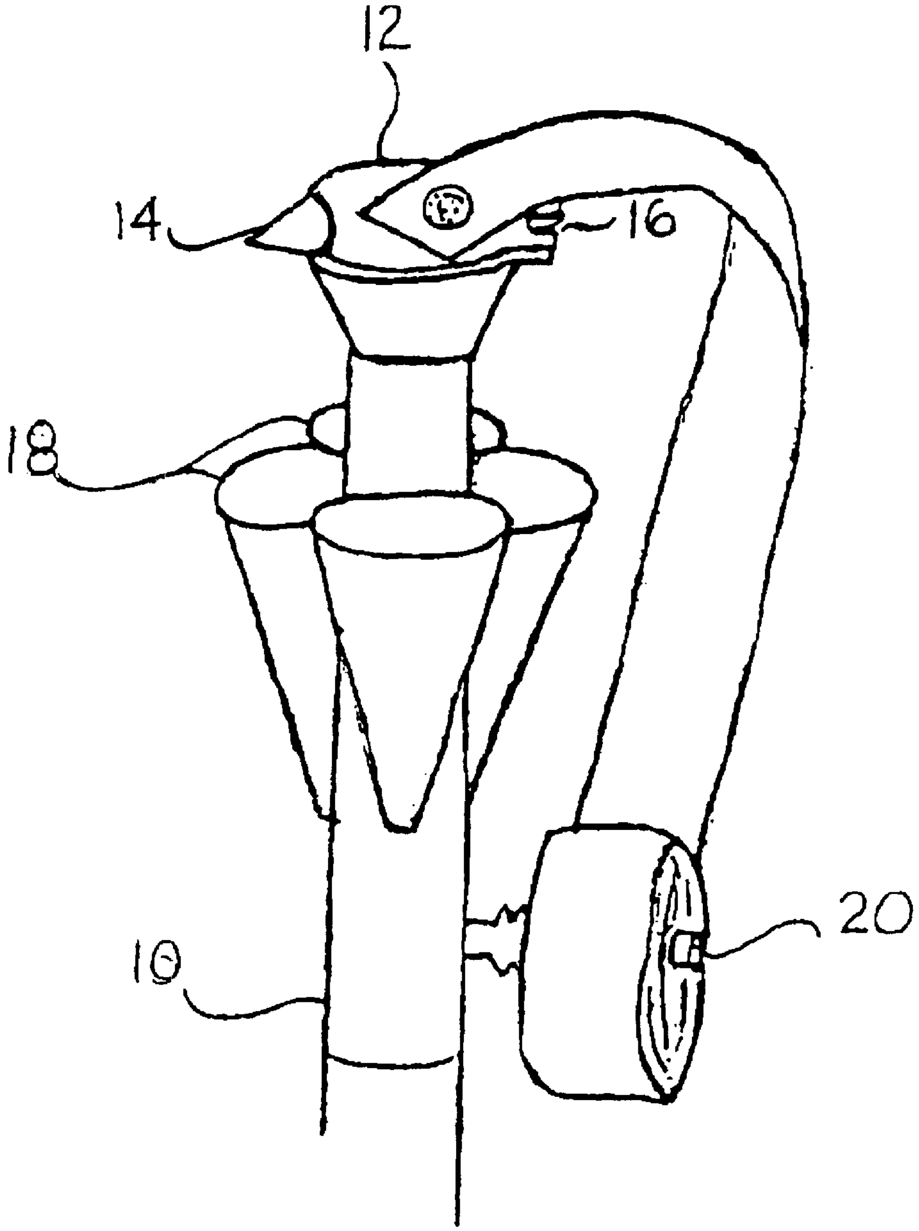
FIG. 2 is a plan view of the extendable pole employing a roll of crepe paper.
Figure 3:
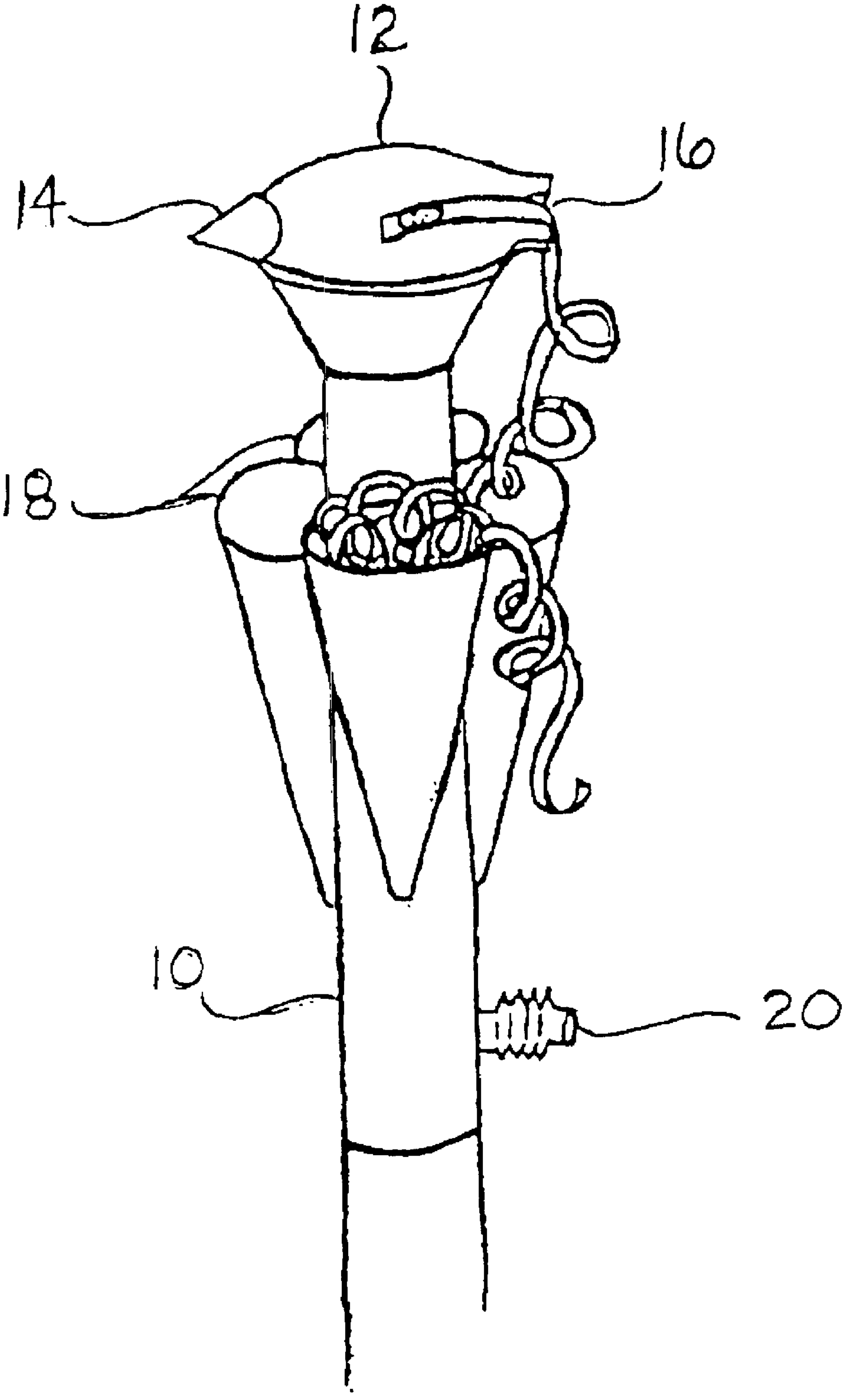
FIG. 3 is a plan view of the extendable pole as used to hang curling ribbon.
Figure 4:
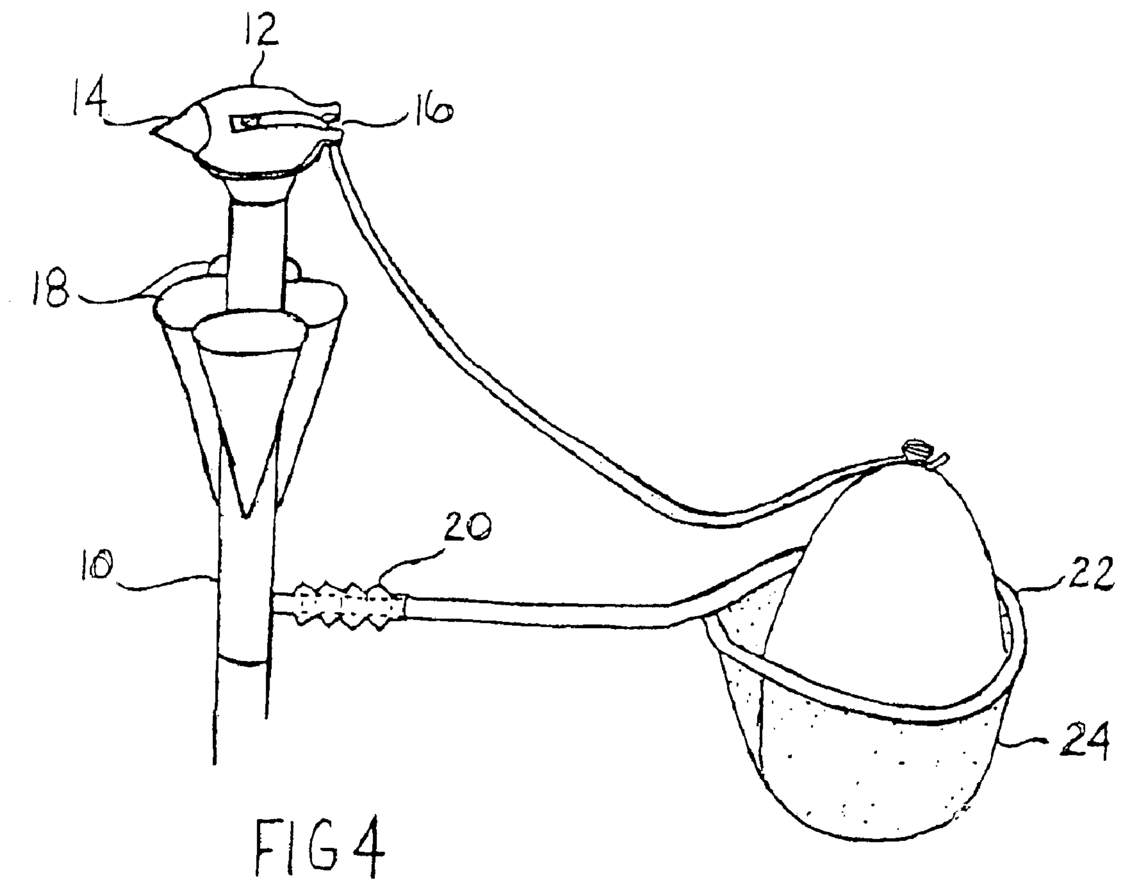
FIG. 4 is a plan view of the hook attachment as employed on the extendable pole when hanging balloons.

FIGS. 2, 3, and 4 illustrate the manner of use for each of the various devices. When curling ribbon has been cut and adhesive placed on the tip, a ribbon is placed in each container 18. The adhesive end of the ribbon is then placed upon the platform 12, adhesive side up. The presence of a cut away slit 16 allows the user to place the upper portion of the ribbon into the slit 16 thereby preventing movement. The pole 10 is then extended and/or raised and the adhesive backing on the ribbon is firmly pressed against the ceiling. The pole 10 is then descended as the ribbon unfurls from the container 18 to hang freely from the ceiling. The adhesive end of the next curling ribbon is placed on the platform 12 and the above mentioned steps are repeated.

To hand crepe paper streamers, the spindle 20 is extended with a single pull. A roll of crepe paper is slid longitudinally upon the spindle 20. Adhesive is applied to the loose end of the crepe paper which is then placed on the platform 12 adhesive side up. The pole 10 is then extended and/or raised to press the adhesive on the crepe paper firmly against the ceiling. The pole 10 is then lowered and held perpendicularly to the desired direction of the streamer so that the crepe paper is pulled transversely from the roll, thereby simultaneously dispensing and twisting the crepe paper into a streamer. At the next desired point of attachment to the ceiling, the pole 10 is lowered and adhesive applied and the above mentioned process is repeated. When the desired length of crepe paper has been draped from the ceiling, the pole is lowered and the streamer cut. Adhesive is applied to the loose end of the streamer which is then placed on the platform 12 and pressed to the ceiling.

To hang balloons or light weight paper art decorations the hook 22 is inserted into the central passageway of the spindle 20 enabling the net 24 to hang open. An adhesive-tipped ribbon is tied to the balloon or paper decoration which is then placed in the net 24. The ribbon is led from the balloon and fed into the slit 16 bringing the adhesive—tipped end of the ribbon onto the platform 12, adhesive side up. The pole 10 is then extended and/or raised and the adhesive backing pressed firmly against the ceiling. The pole 10 is then lowered allowing the balloon or light weight paper object to exit the net 24 and hang freely.

Conclusion, Ramifications, and Scope

Accordingly, one can see that the extension pole for hanging party decorations overhead provides unsurpassed ease and convenience in doing so, removes the barrier of height for the wheelchair bound, offers family participation for all ages, and offers stress free easy removal of the decorations during cleanup. Furthermore, the extension pole has the additional advantages in that it permits a variety of decorations to be hung using only the extension pole provided;

it allows substantial heights to be safely reached without the necessity of ladders or stepping stools;

it permits numerous party decorations to be hung overhead with minimal walking;

it provides access to decorate heretofore inaccessible places such as the ceiling space above stairways; and it permits party decorations to be hung from high ceilings of unusual material such as canopy tents, without puncturing the fabric Although the description above contains many specifications, these should not be construed as limiting the scope of the invention but as merely providing illustrations of some of the presently preferred embodiments of this invention. For example, the extension pole could be comprised of a wooden pole capable of being screwed to another; the platform could be made of an unforgiving substance supported by a spring; the containers could be any number of acceptable shapes, such as spherical, triangular, etc. The net 24 could also be made of plastic.

Thus the scope of the invention should be determined by the appended claims and their legal equivalents, rather than by the examples given.

I claim:

1. An elongated pole capable of reaching substantial heights comprising:

a. a platform with lead-in slit connected atop said pole;

b. a ribbon hanging means comprising:
  b1. a plurality of containers;
  b2. said containers attached contiguously to said pole c. a crepe paper dispensing means comprising:
  c1. a laterally extensible spindle;
  c2. said crepe paper device being disposed on a side of said pole d. a balloon hanging means attached to said pole's lower body comprising:
  d1. a laterally extending hook
  d2. said hook being removable from pole and adapted for insertion into said laterally extensible spindle;
  d3. said balloon hanging means further comprising a net adapted to hang from the inner curves of said hook.

2. A decorating device as recited in claim 1, comprising:

a. an upper platform, contiguous containers, a lateral spindle, and a netted hook, respectively, selectively spaced beneath each other along said pole.

3. A decorating device as recited in claim 1, further including a length of hanging material spaced apart on opposite sides of the distal end of said pole.

* * * * *